United States Patent
Henriksen et al.

(10) Patent No.: US 10,697,260 B2
(45) Date of Patent: Jun. 30, 2020

(54) TUBULAR ROTATION DETECTION SYSTEM AND METHOD

(71) Applicant: Cameron International Corporation, Houston, TX (US)

(72) Inventors: Ulf Henriksen, Mandal (NO); Anstein Jorud, Kristiansand (NO)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 73 days.

(21) Appl. No.: 15/423,109

(22) Filed: Feb. 2, 2017

(65) Prior Publication Data

US 2018/0216423 A1   Aug. 2, 2018

(51) Int. Cl.
| E21B 19/16 | (2006.01) |
| E21B 17/042 | (2006.01) |
| G01L 5/24 | (2006.01) |
| B23P 19/06 | (2006.01) |

(52) U.S. Cl.
CPC .......... *E21B 19/161* (2013.01); *B23P 19/061* (2013.01); *E21B 17/042* (2013.01); *E21B 19/165* (2013.01); *E21B 19/168* (2013.01); *G01L 5/24* (2013.01)

(58) Field of Classification Search
CPC ................ E21B 19/161; G01L 5/24
See application file for complete search history.

(56) References Cited

U.S. PATENT DOCUMENTS

| 3,745,820 A * | 7/1973 | Weiner ................. E21B 19/166 173/181 |
| 4,091,451 A * | 5/1978 | Weiner .................... B23P 19/06 173/182 |
| 5,609,077 A * | 3/1997 | Ohmi .................... B25B 13/481 81/467 |
| 6,276,466 B1 | 8/2001 | Boyd |
| 6,385,837 B1 * | 5/2002 | Murakami ............ B23P 19/066 285/333 |
| 8,074,537 B2 * | 12/2011 | Hunter ................. E21B 19/168 81/57.16 |
| 8,590,401 B2 * | 11/2013 | Conquergood ....... E21B 19/165 73/862.08 |
| 2002/0121012 A1 | 9/2002 | Murakami et al. |
| 2004/0003490 A1 * | 1/2004 | Shahin .................... E21B 19/16 29/464 |
| 2009/0266539 A1 | 10/2009 | Ruark et al. |

(Continued)

*Primary Examiner* — Robert E Fuller
*Assistant Examiner* — Theodore N Yao
(74) *Attorney, Agent, or Firm* — Helene Raybaud

(57) ABSTRACT

A system for use in a mineral extraction system includes a spinner assembly having a motor configured to drive rotation of a roller shaft. The spinner assembly also includes a roller non-rotatably coupled to the roller shaft and configured to contact a first tubular structure, and rotation of the roller is configured to cause rotation of the first tubular structure until the first tubular structure is spun into a second tubular structure. The spinner assembly further includes a detection wheel coupled to the roller shaft and configured to contact the first tubular structure, and the detection wheel is configured to rotate with the first tubular structure and to rotate independently of the roller. The spinner assembly further includes a sensor configured to detect rotation of the detection wheel.

20 Claims, 9 Drawing Sheets

(56) References Cited

U.S. PATENT DOCUMENTS

| | | | |
|---|---|---|---|
| 2013/0205955 A1* | 8/2013 | Qi | B23P 19/06 |
| | | | 81/469 |
| 2015/0021016 A1 | 1/2015 | Deng et al. | |
| 2015/0107857 A1* | 4/2015 | Mosing | E21B 19/07 |
| | | | 166/382 |
| 2016/0047168 A1 | 2/2016 | Bowley | |

* cited by examiner

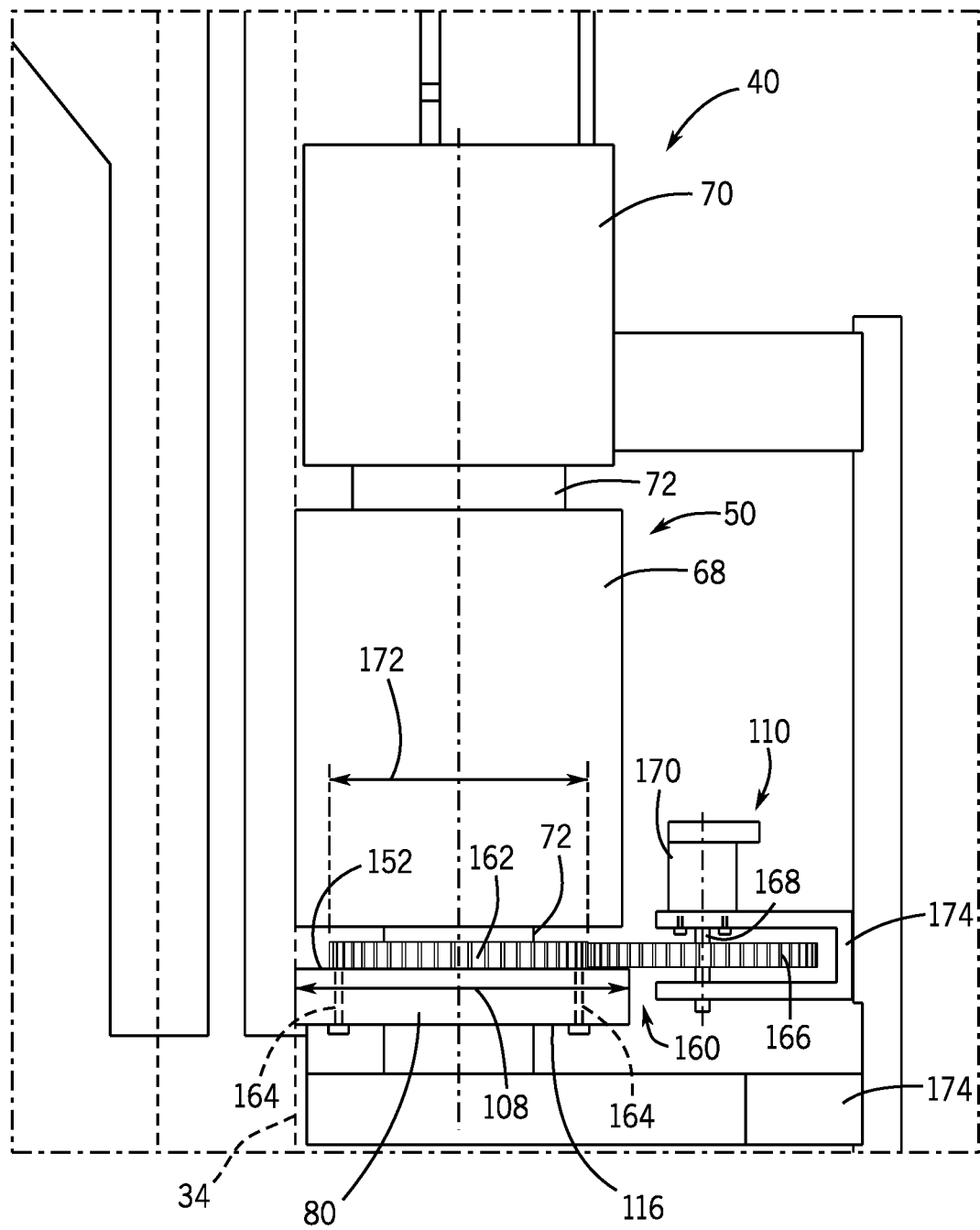
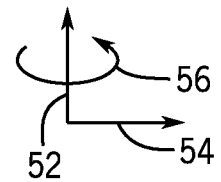
FIG. 7

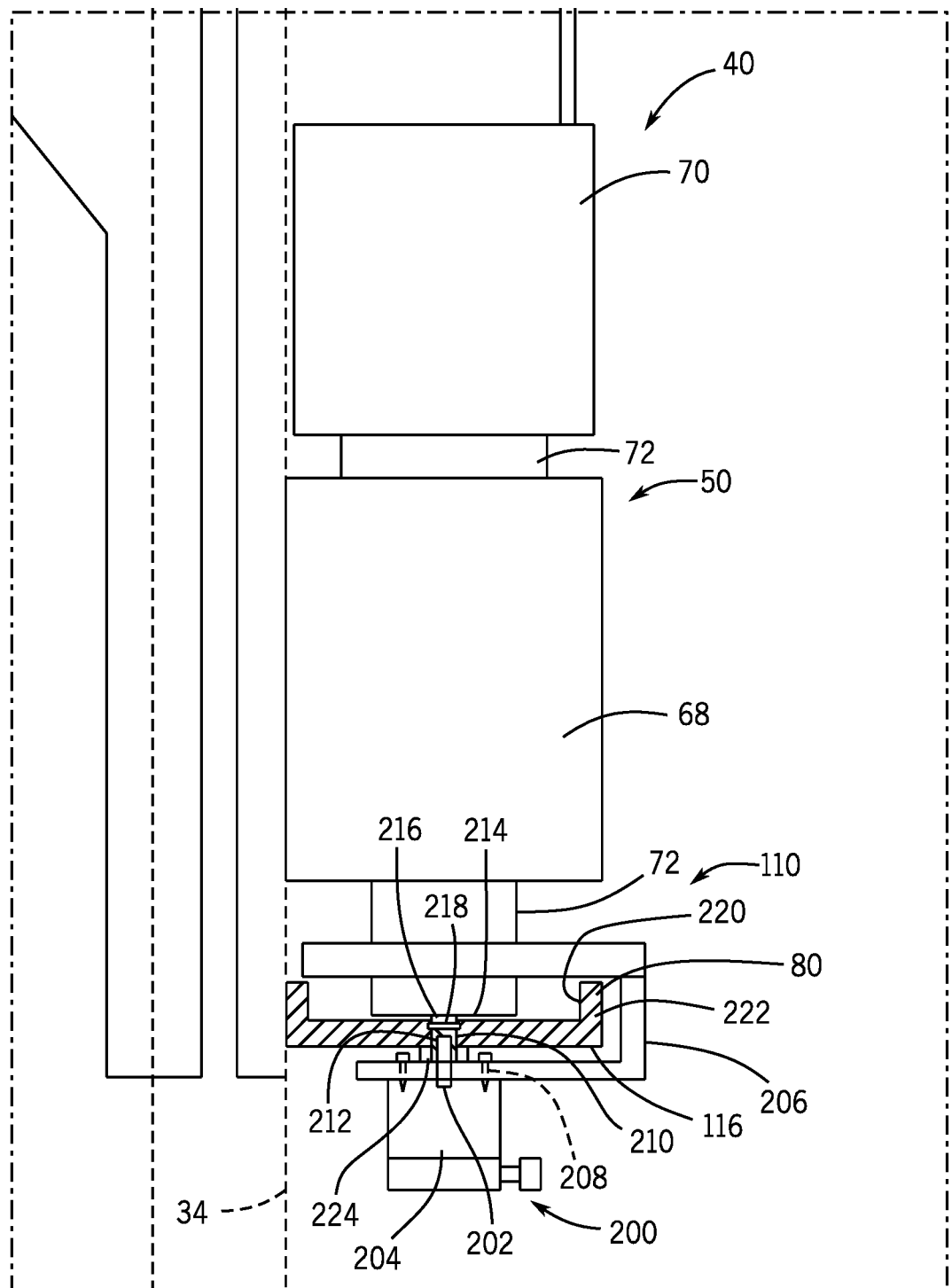
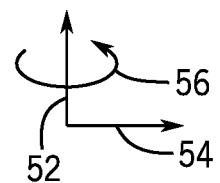
FIG. 9

TUBULAR ROTATION DETECTION SYSTEM AND METHOD

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Natural resources, such as oil and gas, are used as fuel to power vehicles, heat homes, and generate electricity, in addition to various other uses. Once a desired resource is discovered below the surface of the earth, drilling and production systems are often employed to access and extract the resource. These systems may be located onshore or offshore depending on the location of the desired resource. Further, such systems may include a wide variety of components, such as various casings, fluid conduits, tools, and the like, that facilitate extraction of the resource from a well during drilling or extraction operations. In some systems, a roughneck may be utilized to make-up and break-out threaded joints between pipe sections that form a drill string. Such roughnecks may include a spinner assembly that is configured to spin (i.e., rotate) one pipe section relative to another pipe section to threadably couple or to disconnect the pipe sections from one another. However, some spinning assemblies may not reliably detect when the pipe sections are spun in (e.g., threadably coupled to one another), which may result in increased wear on the drill pipe and/or components of the spinner assembly, incomplete coupling of the pipe sections, and/or inefficient drilling operations, for example.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein:

FIG. 7 is a side view of an embodiment of the tubular rotation detection system of FIG. 1 having a gear assembly;

FIG. 9 is a side view of an embodiment of the tubular rotation detection system of FIG. 1 having a rotary encoder;

DETAILED DESCRIPTION OF SPECIFIC EMBODIMENTS

Figure 1:
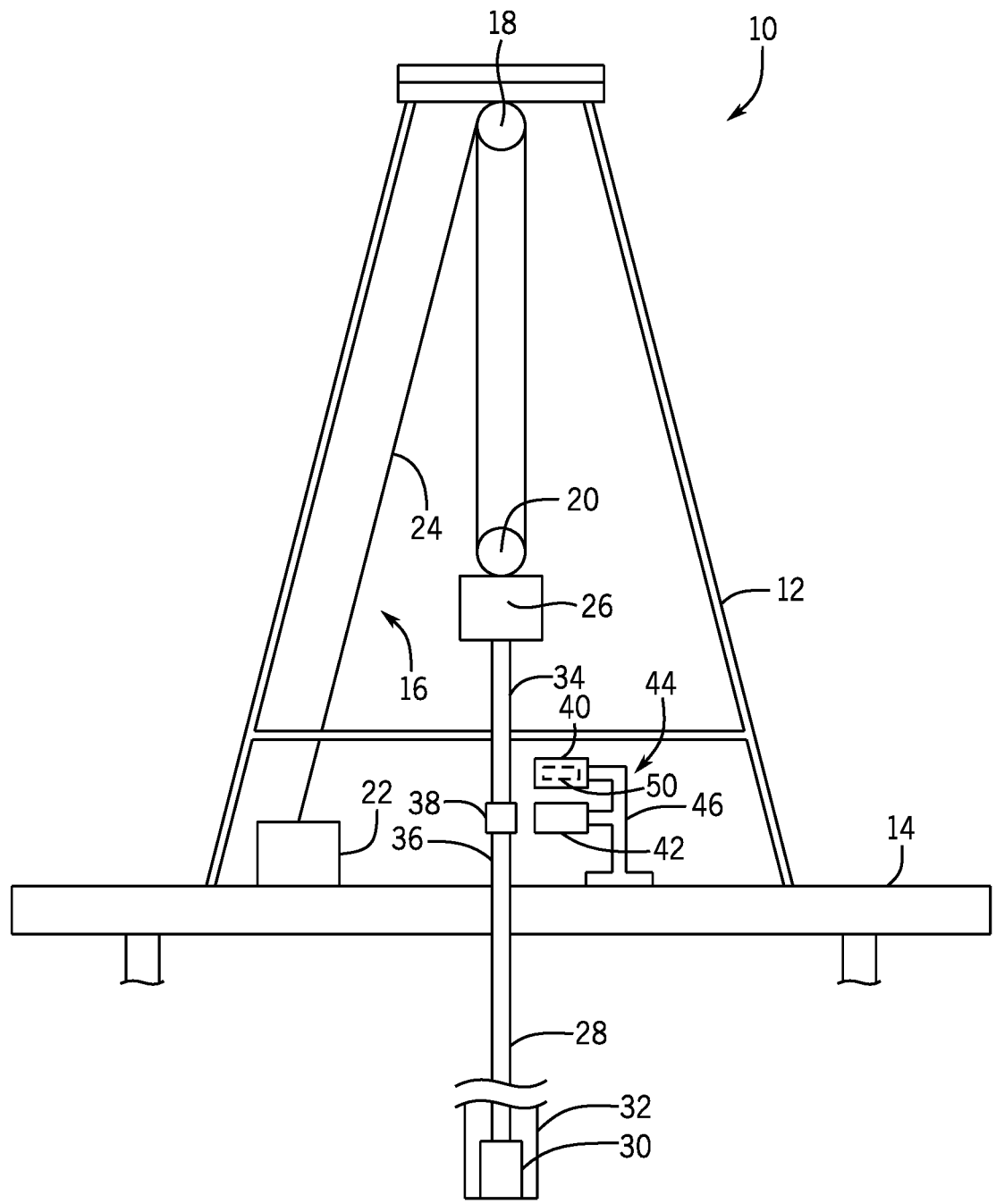
FIG. 1 is a schematic diagram of a portion of a drilling and production system having a tubular rotation detection system, in accordance with an embodiment of the present disclosure.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present embodiments are generally directed to tubular rotation detection systems and methods that may be utilized to monitor rotation of a tubular (e.g., pipe section, drill pipe collar, casing section, or the like) within a drilling and production system. During drilling operations, pipe sections may be joined to one another via corresponding threaded joints (e.g., female and male threaded connectors) to form a drill string that is inserted (e.g., lowered or fed) into a well. To connect the pipe sections to one another (e.g., to make up a threaded joint), a threaded connector at an end of a first pipe section is aligned with a corresponding threaded connector at an end of a second pipe section. A spinner assembly (e.g., spinning system or spinning wrench) is then used to spin (e.g., rotate) the first pipe section relative to the second pipe section to threadably couple the pipe sections to one another (i.e., to spin in the first pipe section).

In some embodiments, a wrench assembly may be used in combination with the spinner assembly to provide a final torque to make-up the threaded joint (e.g., tool joint). In some embodiments, a backup wrench may be provided to support the second pipe section as the first pipe section rotates. The spinner assembly may rotate the first pipe section at a relatively higher rotational rate and/or or provide relatively less torque than the wrench assembly, and together, the spinner assembly and the wrench assembly may efficiently and securely couple the first and second pipe sections to one another. In some embodiments, the spinner assembly and the wrench assembly may be provided as part of a roughneck system configured to make-up and break-out (e.g., disconnect) threaded joints between the pipe sections.

In certain embodiments, the spinner assembly includes a tubular rotation detection system that is configured to detect and/or to monitor rotation of the first pipe section. For example, during operation of the spinner assembly to spin in the first pipe section, the tubular rotation detection system may detect when the first pipe section stops rotating, which may indicate that the first pipe section is spun in (e.g., fully threaded and/or rotation of a roller of the spinner assembly no longer causes rotation of the first pipe section). The tubular rotation detection system disclosed herein may reliably detect when the first pipe section is spun in, which may result in reduced wear on the first drill pipe and/or components (e.g., the roller, the motor, or the like) of the spinner assembly, facilitate sufficient coupling of the pipe sections, and/or provide efficient drilling operations, for example.

To facilitate discussion, certain embodiments disclosed herein refer to pipe sections and drill strings; however, it should be understood that the disclosed embodiments may be adapted for use with any of a variety of tubular structures, including drill pipe collars, casing sections, or the like. Furthermore, certain embodiments disclosed herein include the roughneck system having a support structure (e.g., arm) that supports both the spinner assembly and the wrench assembly; however, it should be understood that the spinner assembly may be a physically separate structure from the wrench assembly, independently supported (e.g., by a separate support structure) from the wrench assembly, and/or that the wrench assembly may not be provided. Additionally, certain embodiments relate to a subsea (e.g., offshore) drilling and production system; however, it should be understood that the disclosed embodiments may be adapted for use within an onshore (e.g., land-based) drilling and production system.

With the foregoing in mind, FIG. 1 is a schematic diagram of a portion of a drilling and production system 10, in accordance with an embodiment of the present disclosure. As shown, the system 10 includes a derrick 12 supported by a platform 14 (e.g., floating platform or vessel). The system 10 includes a hoisting system 16 configured to raise and to lower drilling equipment relative to the drill floor 14. In the illustrated embodiment, the hoisting system 16 includes a crown block 18, a traveling block 20, a drawworks system 22, and a cable 24 (e.g., wire) that extends from the drawworks system 22 and couples the crown block 18 to the traveling block 20. In the illustrated embodiment, a top drive 26 is coupled to the traveling block 20, and a drill string 28 supporting a drill bit 30 is suspended from the top drive 26 and extends through the platform 14 into a wellbore 32. The top drive 26 may be configured to rotate the drill string 28, and the hoisting system 16 may be configured to raise and to lower the top drive 26 and the drill string 28 relative to the platform 14 to facilitate drilling of the wellbore 32.

As the drill string 28 drills the wellbore 32, new pipe sections may be added to the drill string 28 to lengthen the drill string 28. Thus, the drill string 28 may be formed from multiple pipe sections that are joined to one another via threaded joints. For example, in the illustrated embodiment, a first pipe section 34 (e.g., new pipe section) and a second pipe section 36 may be joined to one another via a threaded joint 38 (e.g., corresponding threads, male threaded connector and female threaded connector, or tool joint). In the illustrated embodiment, a spinner assembly 40 and a wrench assembly 42, which may be part of a roughneck system 44, are supported by a support structure 46 (e.g., movable or articulated arm). During drilling operations, the first pipe section 34 is positioned vertically above the second pipe section 36, and the spinner assembly 40 may then be positioned about the first pipe section 34 and may rotate the first pipe section 34 relative to the second pipe section 36 to spin in (e.g., threadably couple) the first pipe section 34. After the first pipe section 34 is spun in via the spinner assembly 40, the wrench assembly 42 may be used to grasp the first pipe section 42 to apply a final torque (e.g., make-up torque) to make-up the connection. In some embodiments, the wrench assembly 36 may include a torque wrench that grasps the first pipe section 42 to apply the final torque and/or a backup wrench that supports the second pipe section 36 as the first pipe section 34 rotates relative to the second pipe section 36. Operation of the spinner assembly 40, the wrench assembly 42, the support structure 46, and/or other components of the roughneck system 44 may be automated (e.g., controlled by an electronic control system). As discussed in more detail below, the disclosed embodiments may include a tubular detection system 50 that is configured to detect when the first drill pipe 34 is spun in.

Figure 2:
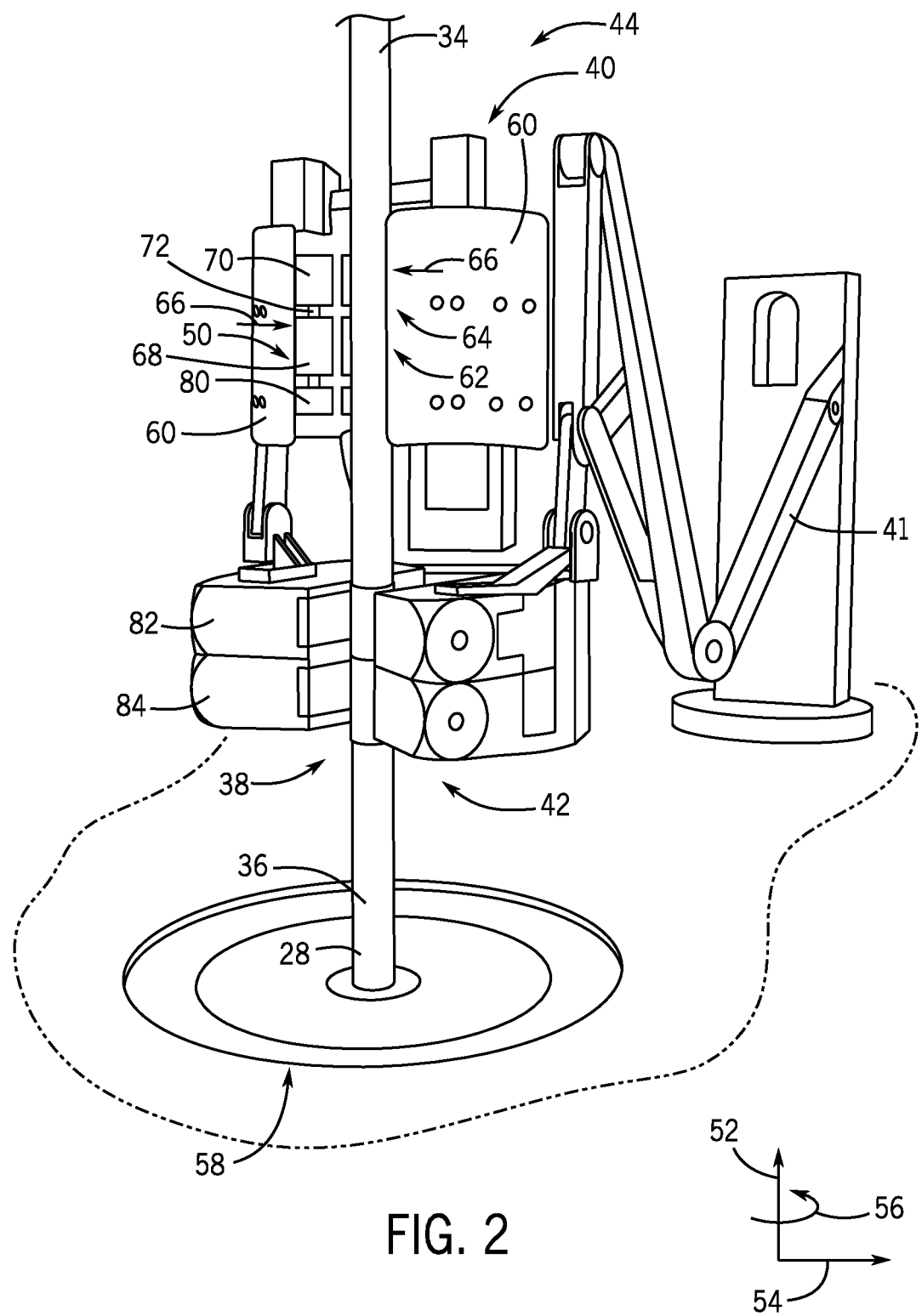
FIG. 2 is a perspective view of a roughneck system having a spinner assembly with the tubular rotation detection system of FIG. 1, in accordance with an embodiment of the present disclosure.

FIG. 2 is a perspective view of an embodiment of the roughneck system 44 having the spinner assembly 40 with the tubular rotation detection system 50. To facilitate discussion, the roughneck system 44 and its components may be described with reference to an axial axis or direction 52, a radial axis or direction 54, and a circumferential axis or direction 56. As shown, the roughneck system 44 includes the support structure 46 that supports the spinner assembly 40 and the wrench assembly 42, and the support structure 46 is configured to move the spinner assembly 40 and the wrench assembly 42 from a first position (e.g., parked or rest position) remote from a well center 58 to the illustrated second position vertically above (e.g., along the axial axis 52) and aligned with (e.g., along the radial axis 54) the well center 58. In the second position 54, the spinner assembly 40 may extend circumferentially about the first pipe section 34.

In the illustrated embodiment, the spinner assembly 40 includes clamping arms 60 that are pivotally coupled to one another (e.g., via a pin or pivot having a rotational axis parallel to a central or longitudinal axis of the first pipe section 34 extending along the axial axis 52) to enable the clamping arms 60 to move (e.g., in a plane cross-wise or perpendicular to the central or longitudinal axis of the first pipe section 34 extending along the axial axis 52) from the illustrated open position 62 to a closed position. In the open position 62, a gap 64 (e.g., circumferentially-extending gap) between the clamping arms 60 may enable the spinner assembly 40 to receive the first pipe section 34. To move from the open position 62 to the closed position, the clamping arms 60 may be pivoted (e.g., via an actuator, such as a hydraulic, pneumatic, or electronic actuator) toward one another, as shown by arrows 66, thereby closing the gap 64 and bringing one or more rollers 68 into contact with the first pipe section 34.

In the illustrated embodiment, each of the one or more rollers 68 is coupled (e.g., non-rotatably coupled) to a respective motor 70 (e.g., hydraulic or electronic motors) via a roller shaft 72 (e.g., a spinner roller center shaft). The roller shaft 72 supports the roller 68 and is coupled to an output shaft of the motor 70. In operation, the motors 70 drive rotation of the rollers 68, and frictional forces between a pipe-contacting surface (e.g., radially-outer surface) of each of the rollers 68 and the first pipe section 34 cause the first pipe section 34 to rotate, thereby spinning the first pipe section 34 into the second pipe section 36.

In the illustrated embodiment, the spinner assembly 40 includes the tubular rotation detection system 50, which may include at least one detection wheel 80 (e.g., annular wheel or pipe-contacting member) coupled (e.g., rotatably coupled) to one roller shaft 70. As discussed in more detail below, when the spinner assembly 40 is in the closed position, the detection wheel 80 may contact the first pipe section 34. In operation, as the first pipe section 34 rotates, frictional forces between the first pipe section 34 and a pipe-contacting surface (e.g., radially-outer surface) of the detection wheel 80 cause the detection wheel 80 to rotate. Thus, the detection wheel 80 rotates with the first pipe section 34 and independently from the roller 68. Thus, rotation of the detection wheel 80 is indicative of rotation of the first pipe section 34. As discussed in more detail below, the tubular rotation detection system 50 may include a sensor configured to monitor rotation of the detection wheel 80 and a control system configured to determine whether the first pipe section 34 is rotating or stationary) based on the rotation of the detection wheel 80.

As shown in FIG. 2, the roughneck assembly 44 includes the wrench assembly 42 having a torque wrench 82 and a backup wrench 84. In the illustrated embodiment, the torque wrench 82 may be configured to grasp (e.g., clamp) the first pipe section 34 (e.g., a threaded joint portion 86 of the first pipe section 34) to apply the final torque to make-up the threaded joint 38, and the backup wrench 84 may be configured to support (e.g., grasp, clamp, hold stationary) the second pipe section 36 (e.g., a threaded joint portion 88 of the second pipe section 36) as the first pipe section 34 rotates relative to the second pipe section 36.

Figure 3:
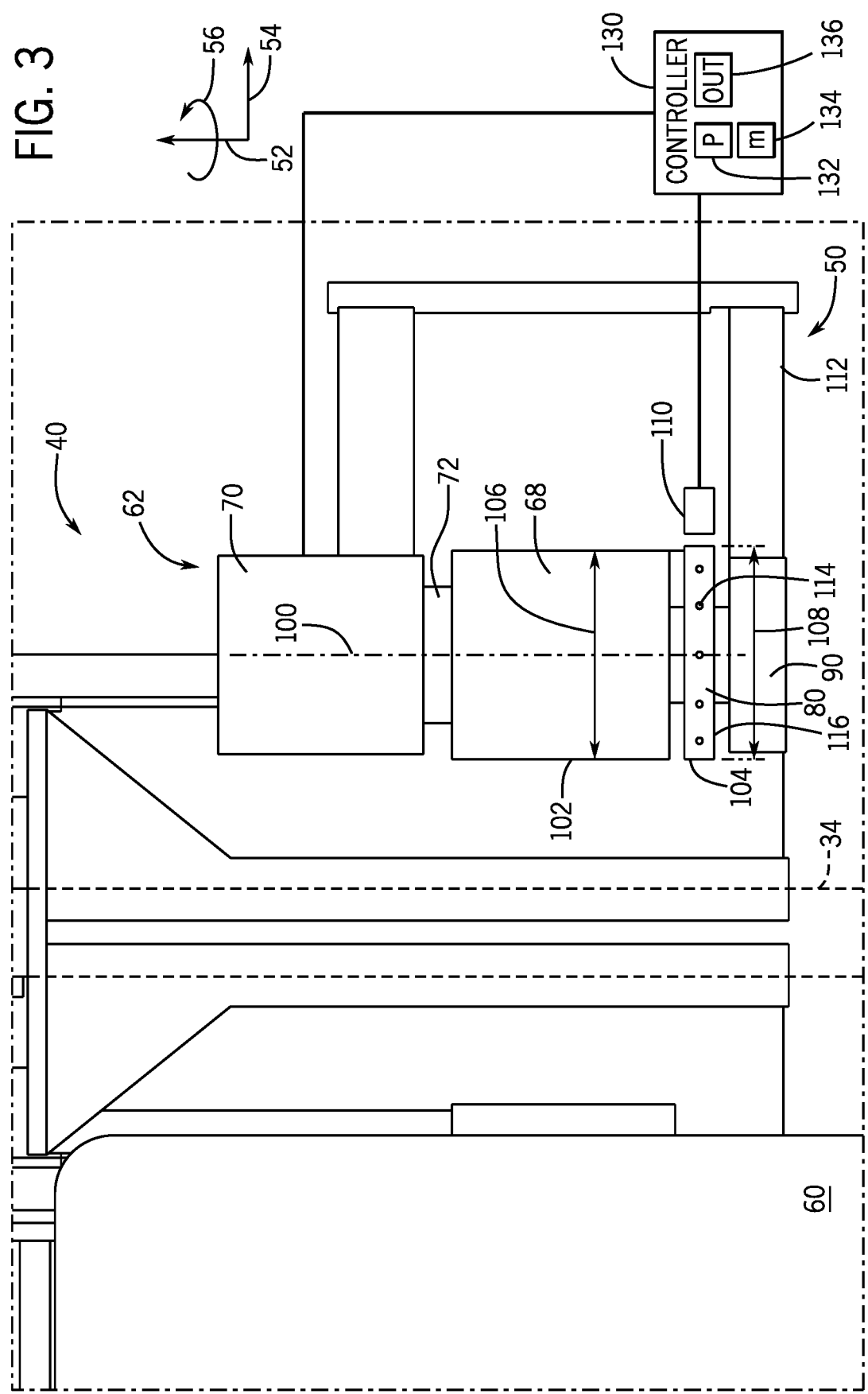
FIG. 3 is a side view of an embodiment of the tubular rotation detection system of FIG. 1.

FIG. 3 is a cross-sectional side view of a portion of the spinner assembly 40 with the detection wheel 80 of the tubular rotation detection system 50. As shown, the spinner assembly 40 includes the roller 68, the motor 70, and the roller shaft 72. A bearing housing 90 supporting a bearing may be provided to support one end of the roller shaft 72. The first pipe section 36 is illustrated in dotted lines for image clarity and to facilitate discussion.

As discussed above, the roller 68 is coupled to the roller shaft 72 (e.g., non-rotatably coupled, such as via a fastener or press fit, so as to rotate with the roller shaft 72), and the detection wheel 80 is coupled to the roller shaft 72 (e.g., rotatably coupled so as to rotate independently from the roller shaft 72). Thus, the roller 68, the roller shaft 72, and the detection wheel 80 share a rotational axis 100 (e.g., central axis). In the illustrated embodiment, a diameter 106 (e.g., outer diameter) of the roller 68 is approximately equal to (e.g., within plus or minus 1, 2, 3, 4, 5, or 10 percent of) a diameter 108 (e.g., outer diameter) of the detection wheel 80.

When the spinner assembly 40 is in the closed position, a pipe-contacting surface 102 of the roller 68 (e.g., radially-outer annular surface) and a pipe-contacting surface 104 (e.g., radially-outer annular surface) of the detection wheel 80 may each contact the first pipe section 34. Rotation of the roller 68 may cause rotation of the first pipe section 34, and the detection wheel 80 may rotate with the first pipe section 34. The detection wheel 80 may rotate independently from the roller 68, which may enable reliable monitoring of rotation of the first pipe section 34, even when the first pipe section 34 does not rotate with the roller 68 (e.g., the first pipe section 34 is fully spun in and/or the roller 68 slips on and rotates relative to the first pipe section 34). In operation, the first pipe section 34 will generally rotate with the roller 68 until the first pipe section 34 is fully spun into the second pipe section 36. Detection of when the first pipe section 34 is fully spun into the second pipe section 36 may enable the spinner assembly 40 to stop the motors 70 at an appropriate time and/or in a timely manner, thereby limiting wear on the components (e.g., the rollers 68, the motors 70, or the like), facilitating sufficient coupling of the first pipe section 34 to the second pipe section 36 (e.g., the spinner assembly 40 may operate the motors 70 to rotate the first pipe section 34 until rotation of the first pipe section 34 stops), and/or enabling efficient drilling operations.

As shown the tubular rotation detection system 50 may also include a sensor 110 (e.g., proximity switch or hall-effect sensor) coupled to a frame 112 (e.g., support structure) or other suitable component (e.g., the bearing housing 90) of the spinner assembly 40. While the sensor 110 in the illustrated embodiment is a proximity switch, it should be understood that the sensor 110 may be any suitable type of sensor configured to detect rotation of the detection wheel 80, such as any suitable type of optical sensor, pressure sensor, magnetic sensor, or the like. The detection wheel 80 may include features, such as the illustrated flags 114 (e.g., magnetic or metal [e.g., steel] flags), that are detectable by the sensor 110. As shown, the detection wheel 80 includes multiple flags 114 positioned circumferentially (e.g., equally spaced) about the detection wheel 80, and the sensor 110 is configured to detect the flags 114 as they pass through or across the sensor 110 during rotation of the detection wheel 80. The detection wheel 80 may include any suitable number (e.g., 1, 2, 3, 4, 5, 10, 20, 30, 40, 50, or more) flags 114 positioned on any suitable surface (e.g., the pipe-contact surface 104 or an axially-facing surface 116) of the detection wheel 80, and the sensor 110 may be positioned accordingly to detect the flags 114 (e.g., the sensor 110 may be positioned proximate the axially-facing surface 116 of the detection wheel 80, or any other suitable location above or below the detection wheel 80 along the axial axis 52 or adjacent to the detection wheel along the radial axis 54). The flags 114 may have any suitable form. For example, in some embodiments, the flags 114 may include bolts threadably coupled to corresponding recesses within the detection wheel 80. As discussed in more detail below with respect to FIGS. 5-9, the tubular rotation detection system 50 may include additional or alternative features to facilitate detection of the detection wheel 80 by the sensor 110, such as flexible loops, gears, encoders, or the like.

Regardless of the form of the sensor 110 and associated components, the sensor 110 may provide signals to a controller 130 (e.g., electronic controller), which may include a processor, such as the illustrated microprocessor 132, and a memory device 134. The controller 130 may be configured to process the signals from the sensor 110 to determine whether the detection wheel 80 is rotating or is stationary, which in turn is indicative of whether the first pipe section 34 is rotating or is stationary. For example, if the sensor 110 does not detect any flags 114 over a certain period of time, the controller 130 may determine that the first pipe section 34 is stationary. Additionally or alternatively, in some embodiments, the controller 130 may be configured to determine (e.g., count) a number of rotations of the first pipe section 34 based on the signals received from the sensor 110. Additionally or alternatively, in some embodiments, the controller 130 may be configured to determine other parameters related to the first pipe section 34, such as a rotational speed of the first pipe section 34 based on the signals received from the sensor 110, changes or trends in rotational speed of the first pipe section 34 over time, characteristics of the rotational speed of the first pipe section 34 over time (e.g., erratic or inconsistent rotational speed over time), or the like. Such information may be used by the controller 130 to assess a status (e.g., stationary or rotating) of the first pipe section 34 or a potential problem with the spinner assembly 40 (e.g., improper threading, improper contact between the first pipe section 34 and the spinner assembly 40, the roller 68 slipping on the first pipe section 34, or the like). For example, the number of rotations may indicate whether threads were skipped or improper coupling of the first pipe section 34 to the second pipe section 36 (e.g., the first pipe section 34 continues to rotate after completing a number of rotations at which the first pipe section 34 is normally fully spun in). For example, the rotational speed of the first pipe section 34 may enable the controller 130 to determine whether the spinner assembly 40 is driving the first pipe section 34 to rotate at an expected speed for a given motor speed. In particular, in some embodiments, the controller 130 may receive an input indicative of a motor speed (e.g., from a motor speed sensor, valve control sensors, such as valve position sensors, timers, or any other suitable sensor or input), which is indicative of the rotational speed of the roller 68, and the signals received from the sensor 110, which are indicative of the rotational speed of the first pipe section 34. The controller 130 may determine an expected rotational speed of the first pipe section 34 for the given rotational speed of the roller 38 and may compare the expected rotational speed to the detected rotational speed of the first pipe section 34 to determine a potential problem. For example, in some embodiments, the controller 130 may determine a difference between the expected rotational speed and the detected rotational speed of the first pipe section 34, determine whether the difference is constant, varying (e.g., increasing or decreasing), erratic, or the like over time, which may indicate a potential problem, such as improper threading, a jam that blocks rotation of the first pipe section 34, slipping on the first pipe section 34, or the like. In some embodiments, the controller 130 may be configured to determine a degree of the problem (e.g., a degree of slipping, etc.) based on the difference or other determined characteristics.

In some embodiments, the controller 130 may be configured to provide an output based on the signals generated by the sensor 110. For example, in some embodiments, the controller 130 may be configured to instruct an output device 136 (e.g., a display, a speaker, a light, or other device configured to provide a visual or an audible output, such as an alarm, light, graphical display, or text message) to provide a visual or an audible output indicative of whether the first pipe section 34 is rotating or stationary, a number of rotations of the first pipe section 34, a rotational speed of the first pipe section 34, changes or trends, characteristics, and/or an indication that the first pipe section 34 is fully spun into the second pipe section 36. In some embodiments, the controller 130 may be configured to instruct the output device 136 to provide an indication, such as an audible alarm or text warning message, that the spinner assembly 40 is not operating properly, such as if the rotational speed of the first pipe section 34 does not correspond with an expected speed and/or if the first pipe section 34 continues to rotate after completing a number of rotations at which the first pipe section 34 should be fully spun in, for example. In some embodiments, the controller 130 may be configured to provide an output indicative of the difference between the expected rotational speed and the detected rotational speed of the first pipe section 34, a degree of the problem, or any other features discussed herein.

In some embodiments, the controller 130 may be configured to provide a control signal to control one or more components of the spinner assembly 40 or the roughneck system 44 based on the signals generated by the sensor 110. For example, once the controller 130 determines that the first pipe section 34 is no longer rotating and/or is fully spun into the second pipe section 36, the controller 130 may provide a control signal to the motors 70 to automatically stop operation of the motors 70. In some embodiments, the controller 130 may provide a control signal (e.g., to a motor that drives the arms 60, to a motor that drives the support structure 46, to a motor that drives the wrench assembly 42) to automatically move the spinner assembly 40 from the closed position to the open position 62, to adjust the support structure 46 to automatically move the spinner assembly 40 away from the first pipe section 34 and away from the well center 58, and/or to automatically adjust the wrench assembly 42 to move to the closed position about the first and/or second pipe sections 34, 36 and/or to provide the final torque to make-up the threaded joint 38 in response to determination that the first pipe section 34 is no longer rotating and/or is fully spun into the second pipe section 36, for example.

It should be understood that the controller 130 may be a distributed controller or a control system having multiple controllers positioned at various locations about the spinner assembly 40 and/or the roughneck system 44. Thus, to the extent that certain processing functions are described as carried out by the controller 130 to facilitate discussion, it should be understood that such processing functions may be carried out by different controllers at various locations. In certain embodiments, the controllers (e.g., the controller 130) disclosed herein are electronic controllers having electrical circuitry configured to process signals. The processor 132 may be used to execute instructions or software. Moreover, the processor 132 may include multiple microprocessors, one or more "general-purpose" microprocessors, one or more special-purpose microprocessors, and/or one or more application specific integrated circuits (ASICS), or some combination thereof. For example, the processor 132 may include one or more reduced instruction set (RISC) processors. The memory device 134 may include a volatile memory, such as random access memory (RAM), and/or a nonvolatile memory, such as ROM. The memory device 134 may store a variety of information and may be used for various purposes. For example, the memory device 134 may store processor-executable instructions (e.g., firmware or software) for the processor 132 to execute, such as instructions for processing the signals from the sensor 110, determining rotational movement of the detection wheel 80 and the first pipe section 34, determining a number or rotations of the detection wheel 80 and the first pipe section 34, determining a rotational speed of the detection wheel 80 and the first pipe section 34, and/or providing an output (e.g., via the output device 136 or a control signal). The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., algorithms, predetermined thresholds, etc.), instructions (e.g., software or firmware for processing the signals, etc.), and any other suitable data. In the illustrated embodiment, the spinner assembly 40 includes multiple rollers 68 and one detection wheel 80 and corresponding components (e.g., sensor 110); however, it should be understood that multiple detection wheels 80 (e.g., 2, 3, 4, or more) and corresponding components having the same features and characteristics may be provided about the spinner assembly 40.

Figure 4:
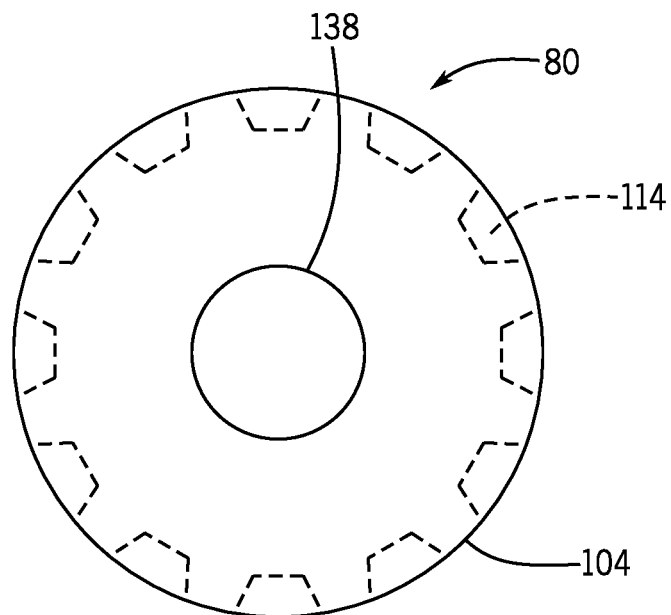
FIG. 4 is a top view of an embodiment of a detection wheel that may be utilized in the tubular rotation detection system of FIG. 1.

FIG. 4 is a top view of an embodiment of the detection wheel 80 that may be utilized within the tubular detection rotation system 50. As shown, the detection wheel 80 includes multiple flags 114 positioned circumferentially (e.g., equally spaced) about the detection wheel 80. The detection wheel 80 includes the pipe-contacting surface 104 that is configured to contact the first pipe section 34 and a central bore 138 that is configured to receive the roller shaft 72.

Figure 6:
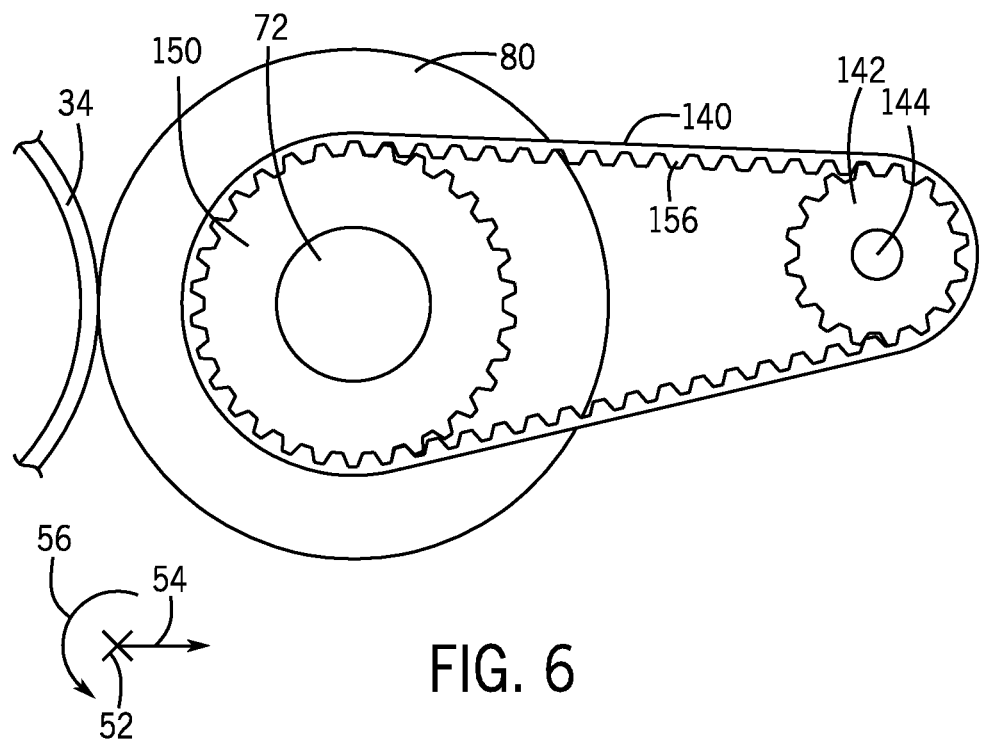
FIG. 6 is a top view of the embodiment of the tubular rotation detection system of FIG. 5.
Figure 5:
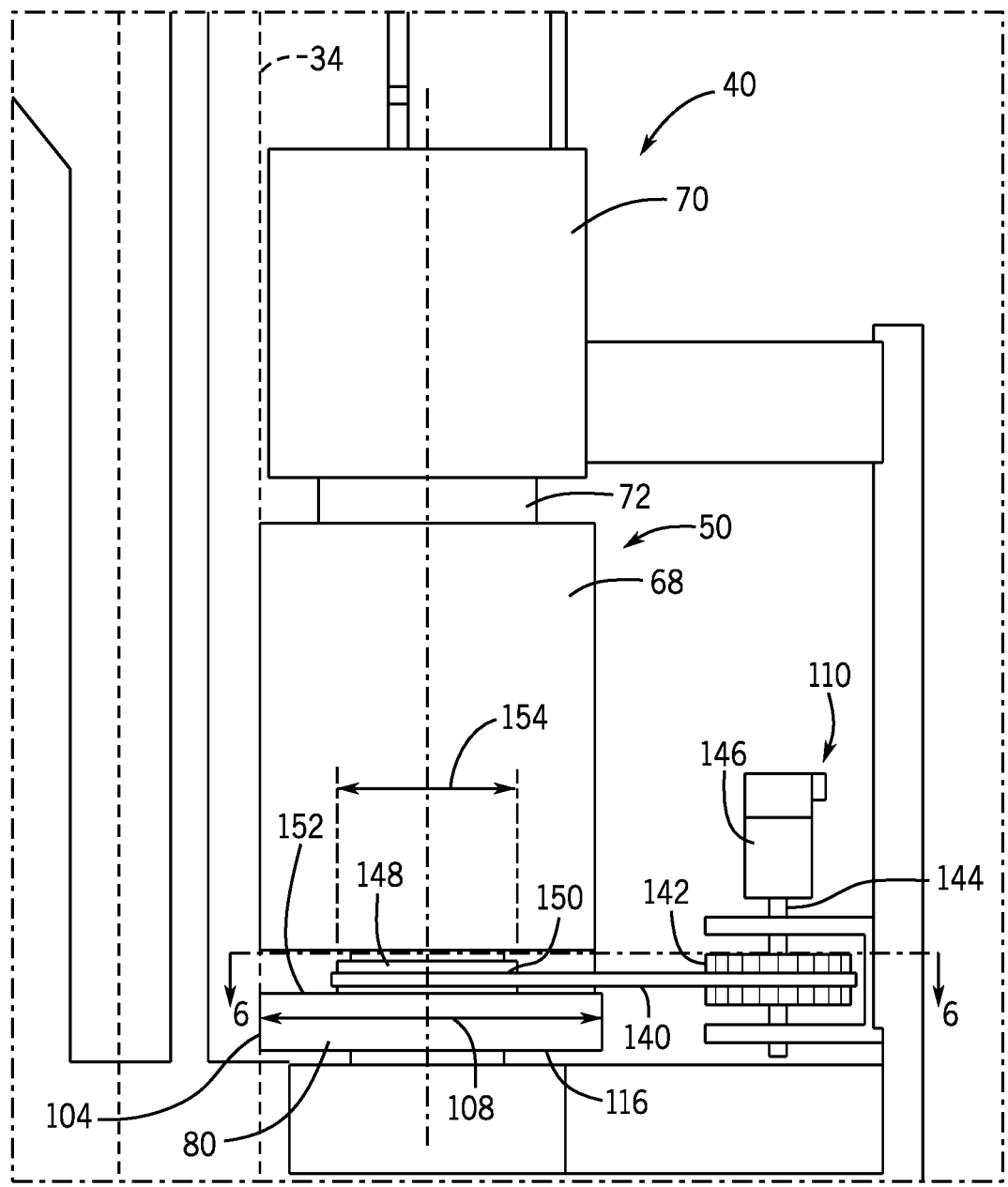
FIG. 5 is a side view of an embodiment of the tubular rotation detection system of FIG. 1 having a flexible loop.

Various features of the tubular rotation detection system 50 are shown in FIGS. 5-10. To facilitate discussion, FIGS. 5 and 7-9 illustrate the spinner assembly 40 in a closed positioned in which the roller 68 contacts the first pipe section 34. FIG. 5 is a side view and FIG. 6 is a top view of an embodiment of the tubular rotation detection system 50 having a flexible loop 140 (e.g., belt, band, rubber band, chain, rolling chain, continuous loop) coupled to an encoder wheel 142 mounted on an encoder shaft 144 of a rotary encoder 146. In operation, the roller 68 drives rotation of the first pipe section 34, and the detection wheel 80 rotates with the first pipe section 34 in the manner discussed above. As the detection wheel 80 rotates, the flexible loop 140 drives rotation of the encoder wheel 142 and the encoder shaft 144. The rotary encoder 146 is configured to detect rotation of the encoder wheel 142 and the encoder shaft 144 and to generate a signal indicative of this rotation (e.g., transform a mechanical angular position into the signal). The signals from the rotary encoder 146 may be provided to a controller (e.g., the controller 130) and processed to determine whether the first pipe section 34 is stationary or rotating and/or to provide an appropriate output in the manner discussed above with respect to FIGS. 1-3, for example.

In some embodiments, the detection wheel 80 may include a loop-support portion 148 (e.g., annular portion) having a groove 150 (e.g., annular groove) that is configured to receive and to support the flexible loop 140. As shown, the loop-support portion 148 extends axially from an axially-facing surface 152 of the detection wheel 80 and is positioned between the roller 68 and the detection wheel 80; however, it should be understood that the loop-support portion 148 may extend from the other axially-facing surface 116 of the detection wheel 80. As shown, the loop-support portion 148 has a generally smaller diameter 154 than the diameter 108 of the detection wheel 80 so that the flexible loop 140 does not contact the first pipe section 34, for example. In the illustrated embodiment, the flexible loop 140 includes teeth 156 (e.g., notches or protrusions) to reduce slippage about the loop-support portion 148 and the encoder wheel 142. However, in some embodiments, the flexible loop 140 and/or the encoder wheel 142 may be devoid of teeth and include generally flat contacting surfaces. In the illustrated embodiment, the rotary encoder 146 and its components are supported by an encoder support frame 158, which may be coupled to a component (e.g., the frame 112) of the spinner assembly 40, for example.

FIG. 7 is a side view of an embodiment of the tubular rotation detection system 50 having a gear assembly 160. As shown, a first gear 162 is coupled to the detection wheel 80 (e.g., non-rotatably coupled so as to rotate with the detection wheel 80) via multiple fasteners 164 (e.g., threaded fasteners, such as bolts). The gear assembly 160 includes a second gear 166 that interlocks (e.g., meshes via corresponding gear teeth) with the first gear 162 and that is coupled to an encoder shaft 168 of a rotary encoder 170. In operation, the roller 68 drives rotation of the first pipe section 34, and the detection wheel 80 rotates with the first pipe section 34 in the manner discussed above. As the detection wheel 80 rotates, the first gear 162 rotates and drives rotation of the second gear 166 and the attached encoder shaft 168. The rotary encoder 170 is configured to detect rotation of the encoder shaft 168 and to generate a signal indicative of this rotation (e.g., transform a mechanical angular position into the signal). The signals from the rotary encoder 170 may be provided to a controller (e.g., the controller 130) and processed to determine whether the first pipe section 34 is stationary or rotating and/or to provide an appropriate output in the manner discussed above with respect to FIGS. 1-3, for example.

As shown, the first gear 162 extends axially from the axially-facing surface 152 of the detection wheel 80 and is positioned between the roller 68 and the detection wheel 80; however, it should be understood that the first gear 162 may extend from the other axially-facing surface 116 of the detection wheel 80. As shown, the first gear 162 has a generally smaller diameter 172 than the diameter 108 of the detection wheel 80 so that the first gear 162 does not contact the first pipe section 34, for example. In the illustrated embodiment, the rotary encoder 170 and its components (e.g., the encoder shaft 168) are supported by an encoder support frame 174, which may be coupled to a component (e.g., the frame 112) of the spinner assembly 40, for example. It should be understood that, in certain embodiments, the second gear 166 may include a flags, such as the flags 114 shown in FIG. 3 that are detectable by a sensor to facilitate detection of rotation of the second gear 166 and the other components, including the first pipe section 34.

Figure 8:
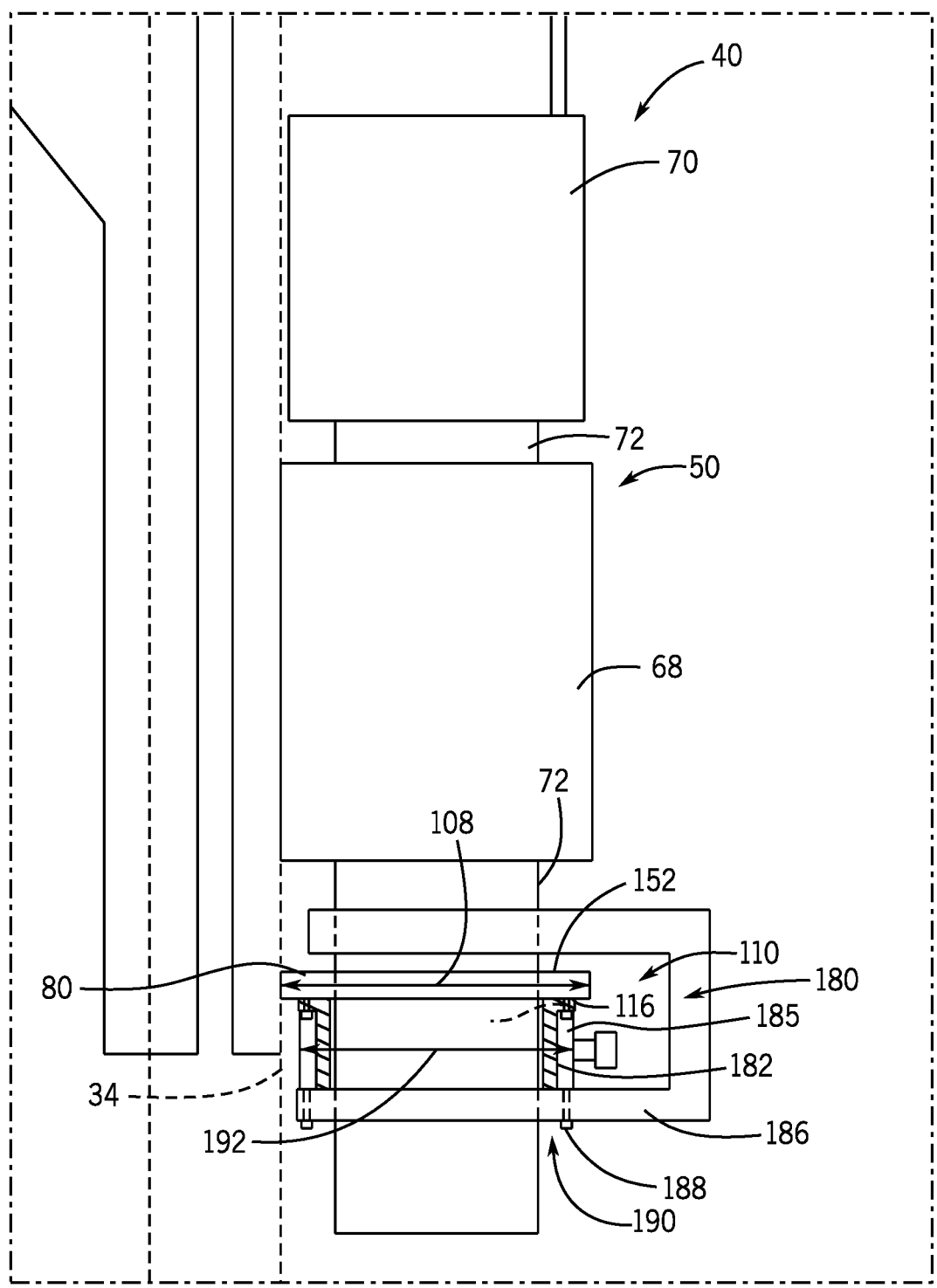
FIG. 8 is a side view of an embodiment of the tubular rotation detection system of FIG. 1 having a hollow shaft encoder.

FIG. 8 is a side view of an embodiment of the tubular rotation detection system 50 having a hollow shaft encoder 180 (e.g., annular encoder). In particular, the detection wheel 80 is coupled to a rotatable portion 182 (e.g., annular) of the hollow shaft encoder 180, such as via one or more fasteners 184 (e.g., threaded fasteners, such as bolts). A stationary portion 185 (e.g., annular) of the hollow shaft encoder 180 is coupled to and supported by an encoder support frame 186 (e.g., via one or more fasteners 188, such as threaded fasteners, such as bolts), which may be coupled to a component (e.g., the frame 112) of the spinner assembly 40, for example. As shown, the roller shaft 72 extends through an opening 190 (e.g., bore) of the hollow shaft encoder 180, and the roller 68, the detection wheel 80, the roller shaft 72, and the hollow shaft encoder 180 are coaxial.

In operation, the roller 68 drives rotation of the first pipe section 34, and the detection wheel 80 rotates with the first pipe section 34 in the manner discussed above. As the detection wheel 80 rotates, the rotatable portion 182 of the hollow shaft encoder 180 rotates and its rotation is detected by the stationary portion 185 of the hollow shaft encoder 180 (e.g., via optical or magnetic detection techniques). The hollow shaft encoder 180 is configured to generate a signal indicative of this rotation (e.g., transform a mechanical angular position into the signal). The signals from the hollow shaft encoder 180 may be provided to a controller (e.g., the controller 130) and processed to determine whether the first pipe section 34 is stationary or rotating and/or to provide an appropriate output in the manner discussed above with respect to FIGS. 1-3, for example.

As shown, the rotatable portion 182 of the hollow shaft encoder 180 extends axially from the axially-facing surface 116 of the detection wheel 80 and is positioned on an opposite side of the detection wheel 80 from the roller 68; however, it should be understood that the rotatable portion 182 may extend from the other axially-facing surface 152 of the detection wheel 80. As shown, the hollow shaft encoder 180 has a generally smaller diameter 192 than the diameter 108 of the detection wheel 80 so that the hollow shaft encoder 180 does not contact the first pipe section 34, for example.

FIG. 9 is a side view of an embodiment of the tubular rotation detection system of FIG. 1 having a rotary encoder 200. The rotary encoder 200 includes a rotatable shaft 202 and a housing 204 that supports processing circuitry. As shown, the encoder housing 204 is coupled to and supported by an encoder support frame 206 (e.g., via one or more fasteners 208, such as threaded fasteners, such as bolts), which may be coupled to a component (e.g., the frame 112) of the spinner assembly 40, for example. In the illustrated embodiment, the detection wheel 80 is coupled to the rotatable shaft 202 of the rotary encoder 200 (e.g., non-rotatably coupled, such as via a fastener or press fit, so that the rotatable shaft 202 and the detection wheel 80 rotate together). In the illustrated embodiment, the rotatable shaft 202 extends into a corresponding recess 212 of a shaft-receiving cap 210 positioned at the axially-facing surface 116 of the detection wheel 80. The detection wheel 80 is positioned at one end 214 of the roller shaft 72, and an extension 216 of the roller shaft 72 may extend into a corresponding recess 218 formed in the axially-facing surface 152 of the detection wheel 80 to facilitate alignment of the detection wheel 80 and the roller shaft 72, while enabling the detection wheel 80 to rotate relative to the roller shaft 72. In some embodiments, the detection wheel 80 may include a recess 220 that receives the roller shaft 72 and/or radially-outer extension 222 (e.g., annular extension extending in the axial direction 52) to increase a surface area of the radially-outer surface 108, while maintaining alignment of the detection wheel 80 and the roller shaft 72. In the illustrated embodiment, a support sleeve 224 (e.g., annular sleeve or bearing) may be provided between the detection wheel 80 and the encoder support frame 206 to facilitate rotation of the detection wheel 80 relative to the encoder support frame 206. As shown, the roller 68, the detection wheel 80, the roller shaft 72, and the encoder shaft 202 are coaxial.

In operation, the roller 68 drives rotation of the first pipe section 34, and the detection wheel 80 rotates with the first pipe section 34 in the manner discussed above. As the detection wheel 80 rotates, the encoder shaft 202 rotates and its rotation is detected by components within the housing 204 of the rotary encoder 200 (e.g., via optical or magnetic detection techniques). The rotary encoder 200 is configured to generate a signal indicative of this rotation (e.g., transform a mechanical angular position into the signal). The signals from the rotary encoder 200 may be provided to a controller (e.g., the controller 130) and processed to determine whether the first pipe section 34 is stationary or rotating and/or to provide an appropriate output in the manner discussed above with respect to FIGS. 1-3, for example.

Figure 10:
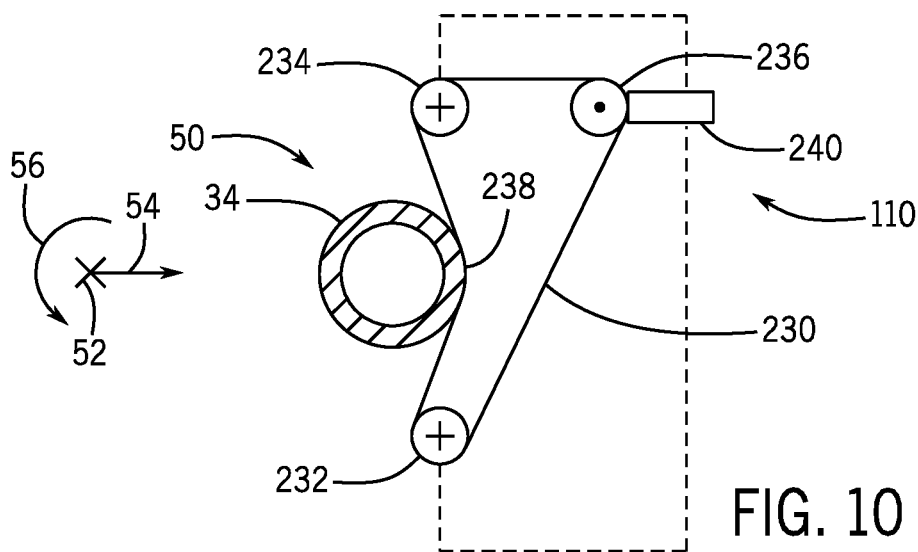
FIG. 10 is a schematic diagram of an embodiment of the tubular rotation detection system of FIG. 1 having a pipe-contacting flexible loop.

FIG. 10 is a schematic diagram of an embodiment of the tubular rotation detection system 50 having another pipe-contacting member, namely pipe-contacting loop 230 (e.g., band, belt, rubber band, chain, rolling chain, continuous loop). In some embodiments, the pipe-contacting loop 230 may be utilized in lieu of or in addition to the detection wheel 80. As shown, the pipe-contacting loop 230 may be support by multiple wheels, such as a first wheel 232 (e.g., idler wheel), a second wheel 234 (e.g., idler wheel), and a third wheel 236 (e.g., an encoder wheel). In operation, the roller 68 drives rotation of the first pipe section 34, and the pipe-contacting loop 230 contacts the first pipe section 34 at an interface 238 such that the pipe-contacting loop 230 is driven (e.g., via friction) via the rotation of the first pipe section 34. Thus, as the first pipe section 34 rotates, the pipe-contacting loop 230 drives rotation of the third wheel 236. A rotary encoder 240 is configured to detect rotation of the third wheel 236 and to generate a signal indicative of this rotation (e.g., transform a mechanical angular position into the signal). The signals from the rotary encoder 240 may be provided to a controller (e.g., the controller 130) and processed to determine whether the first pipe section 34 is stationary or rotating and/or to provide an appropriate output in the manner discussed above with respect to FIGS. 1-3, for example.

Figure 11:
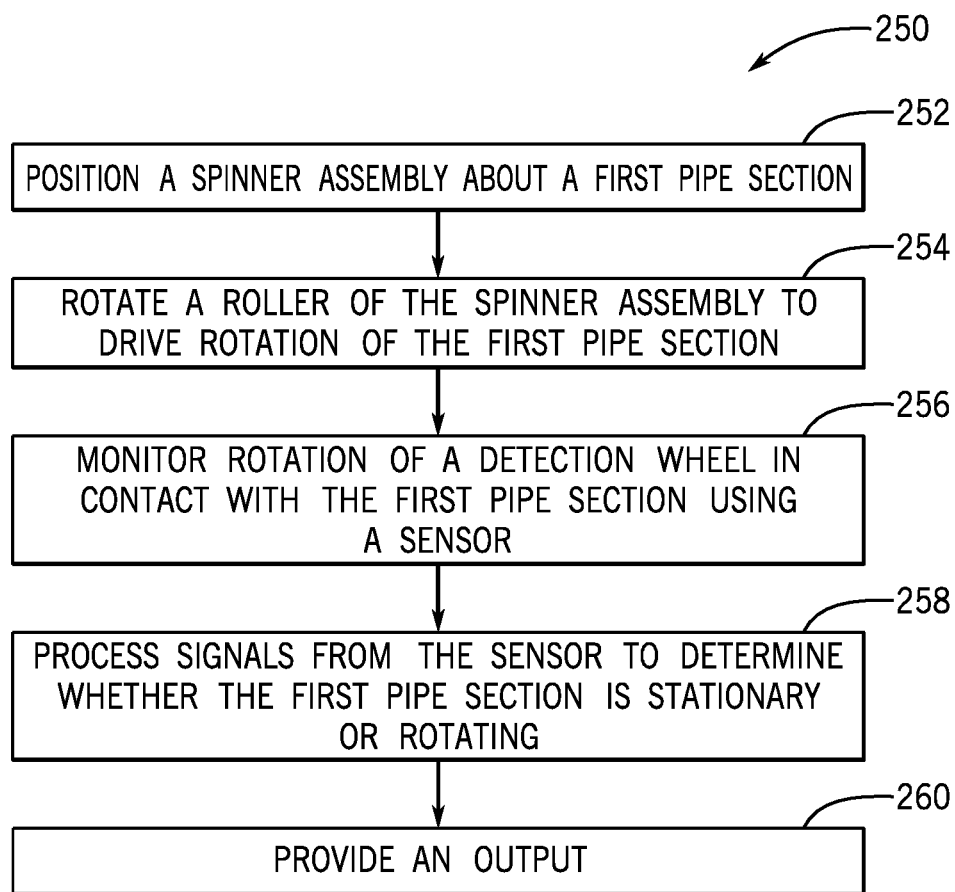
FIG. 11 is a flow diagram of a method of operating the tubular rotation detection system of FIG. 1, in accordance with an embodiment of the present disclosure.

FIG. 11 is a flow diagram of a method 250 of operating the tubular rotation detection system 50, in accordance with an embodiment of the present disclosure. The method 250 includes various steps represented by blocks. It should be noted that the method 250 may be performed as an automated procedure by a system, such as the tubular rotation detection system 50. Although the flow chart illustrates the steps in a certain sequence, it should be understood that the steps may be performed in any suitable order and certain steps may be carried out simultaneously, where appropriate. Further, certain steps or portions of the method 250 may be omitted and other steps may be added. The steps or portions of the method 250 may be performed by separate devices. For example, a first portion of the method 250 may be performed by the processor 132 of the controller 130, while a second portion of the method 250 may be performed by another processor. The method 250 may be carried out periodically (e.g., based on instructions stored in a memory device, such as the memory device 134), in response to operator input, or the like. To facilitate discussion, the method 250 relates to use of the tubular rotation detection system 50 to monitor rotation of pipe section of a drill string. However, it should be understood that the method 250 may be adapted to monitor rotation of any of a variety of components within mineral extraction systems.

The method 250 may begin by positioning the spinner assembly 40 about the first pipe section 34, in step 252. When the spinner assembly 40 is positioned about the first pipe section 34, the roller 68 and the detection wheel 80 contact the first pipe section 34. In step 254, the motor 70 of the spinner assembly 40 may drive rotation of the roller shaft 72 and the attached roller 68. Frictional forces between the pipe-contacting surface 102 of the roller 68 and the first pipe section 34 cause the first pipe section 34 to rotate, thereby spinning the first pipe section 34 into the second pipe section 36. As discussed above, rotation of the first pipe section 34 may drive rotation of the detection wheel 80.

In step 256, the sensor 110 may monitor and generate signals indicative of the rotation of the detection wheel 80. The sensor 110 may have any of a variety of forms and may include a sensor assembly that includes various features, such as flags 114, loops (e.g., the flexible loop 140), gears (e.g., gears 162, 166), encoders (e.g., encoders 146, 170, 180, 200), for example. In some embodiments, the sensor 110 may be a proximity switch configured to detect flags 114 positioned circumferentially about the detection wheel 80, for example.

In step 258, a processor (e.g., the processor 132 of the controller 130) may process the signals generated by the sensor 110 to determine whether the first pipe section 34 is rotating or is stationary. As noted above, the processor may be configured to determine other characteristics, such as the speed of rotation and/or to detect an error or potential problem, for example. In step 260, the controller 130 may provide an output based on the signals generated by the sensor 110 and/or based on whether the first pipe section 34 is rotating or stationary. For example, in some embodiments, the controller 130 may be configured to instruct the output device 136 to provide a visual or an audible output indicative of whether the first pipe section 34 is rotating or stationary, a number of rotations of the first pipe section 34, a rotational speed of the first pipe section 34, and/or an indication that the first pipe section 34 is fully spun into the second pipe section 36. In some embodiments, the controller 130 may be configured to instruct the output device 136 to provide an indication, such as an audible alarm or text warning message, that the spinner assembly 40 is not operating properly. In some embodiments, the controller 130 may be configured to provide a control signal to control one or more components of the spinner assembly 40 or the roughneck system 44 based on the signals generated by the sensor 110, in the manner discussed above.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system for use in a mineral extraction system, comprising:
a spinner assembly, comprising:
a clamp arm configured to surround a portion of a first tubular structure, the clamp arm defining a first side configured to face the first tubular structure;
a motor configured to drive rotation of a roller shaft;
a roller non-rotatably coupled to the roller shaft, such that the roller rotates with the roller shaft, wherein the roller is configured to contact a first tubular structure, and wherein rotation of the roller is configured to cause rotation of the first tubular structure until the first tubular structure is spun into a second tubular structure;
a detection wheel coupled to the roller shaft and coupled to the first side of the clamp arm and configured to contact the first tubular structure, wherein the detection wheel is configured to rotate with the first tubular structure and to rotate independently of the roller, and wherein the roller shaft, the roller, and the detection wheel share a central axis; and
a sensor configured to detect rotation of the detection wheel.

2. The system of claim 1, wherein the sensor comprises a proximity switch.

3. The system of claim 1, wherein the detection wheel comprises at least one magnetic or metallic flag detectable by the sensor.

4. The system of claim 3, wherein the at least one magnetic or metallic flag comprises multiple flags positioned circumferentially about the detection wheel.

5. The system of claim 3, wherein the at least one magnetic or metallic flag comprises at least one bolt threaded into the detection wheel.

6. The system of claim 1, comprising a controller configured to receive a signal from the sensor, to determine rotation of the first tubular structure based on the signal, and to provide an output based on the rotation of the first tubular structure, wherein the output comprises a control signal to stop the motor.

7. The system of claim 1, comprising a controller configured to receive a signal from the sensor, to determine rotation of the first tubular structure based on the signal, and to provide an output based on the rotation of the first tubular structure, wherein the output comprises an instruction to cause an output device to provide an audible or a visual indication of rotation of the first tubular structure.

8. The system of claim 1, wherein the sensor comprises a hollow shaft encoder comprising a rotatable portion that is coupled to the detection wheel and a stationary portion housing circuitry that is configured to detect rotation of the rotatable portion.

9. The system of claim 1, wherein the sensor comprises a gear assembly comprising a first gear coupled to the detection wheel and a second gear meshed with the first gear and coupled to an encoder shaft.

10. The system of claim 1, wherein the sensor comprises a flexible loop coupled to the detection wheel and an encoder shaft.

11. The system of claim 1, wherein the first tubular structure comprises one of a drill pipe section, a drill collar, or a casing section.

12. The system of claim 1, wherein a roller diameter of the roller is equal to a detection wheel diameter of the detection wheel to enable both the roller and the detection wheel to contact a radially-outer surface of the first tubular structure as the roller causes rotation of the first tubular structure.

13. A system for use in a mineral extraction system, comprising:
a clamp arm configured to surround a portion of a first tubular structure, the clamp arm defining a first side configured to face the first tubular structure;
a detection wheel coupled to the first side of the clamp arm and configured to be rotatably mounted on a roller shaft that is configured to drive rotation of a roller of a spinner assembly, wherein the detection wheel is configured to contact the first tubular structure while the spinner assembly is in a closed position about the first tubular structure and as the spinner assembly rotates the first tubular structure; and
a sensor configured to be supported within a frame of the spinner assembly, wherein the sensor is configured to detect rotation of the detection wheel.

14. The system of claim 13, comprising a controller configured to receive a signal indicative of rotation of the detection wheel from the sensor and to identify rotation of the first tubular structure based on the signal.

15. The system of claim 13, wherein the sensor comprises a proximity switch.

16. The system of claim 13, wherein the detection wheel comprises at least one magnetic or metallic flag detectable by the sensor.

17. A method of joining a first tubular structure to a second tubular structure of a mineral extraction system using a spinner assembly, comprising:
moving a clamp arm toward a first tubular structure, the clamp arm defining a first side configured to face the first tubular structure;
operating a motor to drive rotation of a roller shaft and a roller non-rotatably mounted on the roller shaft, such that the roller rotates with the roller shaft, wherein rotation of the roller is configured to cause rotation of the first tubular structure until the first tubular structure is spun into a second tubular structure; and
monitoring, using a sensor, rotation of a detection wheel coupled to the first side of the clamp arm and rotatably mounted on the roller shaft during operation of the motor, wherein the rotation of the detection wheel is indicative of rotation of the first tubular structure.

18. The method of claim 17, wherein monitoring rotation of the detection wheel comprises detecting one or more flags coupled to the detection wheel using the sensor.

19. The method of claim 17, comprising determining rotation of the first tubular structure based on a signal generated by the sensor and providing a control signal to stop operation of the motor if there is no rotation of the first tubular structure, using a controller.

20. The method of claim 17, comprising determining one or more of the rotation of the first tubular structure, a rotational speed of the first tubular structure, or a number of rotations of the first tubular structure based on a signal generated by the sensor, using a controller.

* * * * *